Nov. 26, 1968    G. BESZEDICS ET AL    3,413,522
ELECTRONIC FUSE
Filed March 8, 1966

United States Patent Office 3,413,522
Patented Nov. 26, 1968

3,413,522
ELECTRONIC FUSE
Geza Beszedics and Heinz Loreck, Vienna, Austria, assignors to International Standard Electric Corporation
Filed Mar. 8, 1966, Ser. No. 532,728
Claims priority, application Austria, Mar. 10, 1965, A 2,121/65
4 Claims. (Cl. 317—20)

ABSTRACT OF THE DISCLOSURE

An electronic overload protection device, or circuit breaker, incorporating provisions for limiting make transient current is provided. The device employs a final control element which is responsive to two different feedback loops. Each feedback loop includes a sensing element which senses the controlled system behind the final control element and a control amplifier which couples the sensing element to a selector. The selector is common to both loops and provides a signal to the final control element. A timer is connected to the controlled system before the final control element and provides additional control for the selector.

This invention relates to electronic overload devices termed electronic fuses and more particularly to such devices that have provisions for limiting the make transient current.

Circuit breakers having an extremely short cut-off time are required for protecting electronic devices. Because of the extremely short cut-off time the existing circuit breakers for electronic circuits require additional starting devices for the reenergization of the circuitry protected by the devices. The starters used may be controlled starting resistors, very large starting chokes or electronic controllers.

The known methods of rendering the circuit breaker insensitive to the make transient inherently involve a danger to the devices to be protected.

It is an object of the invention to provide circuit protective devices which avoid the additional starting equipment and nonetheless control the load current so that the circuit breaker function of the circuit is eliminated during the make transient and the make transient current is limited at the same time. At the end of the make transient, the circuit breaker function of the circuit is reestablished before the current limiting function is eliminated.

The inventive circuit arrangement is characterized in that a final control element which is responsive to two different feedback loops, is provided in a controlled system. Each feedback loop includes a sensing element, which senses the controlled system behind the final control element, and a first or second control amplifier, which couples the sensing element to a selector. The selector is common to both circuits and acts on the final control element. In addition, a timer is connected to the controlled system before the final control element and serves to control the selector.

The circuit according to the invention is further characterized in that the final control element consists essentially of a transistor while the first control amplifier is a limiting amplifier and the second amplifier is a trigger circuit.

Furthermore, according to the invention, the final control element for controlling the current, which element consists essentially of a transistor, is connected, on the one hand, to the limiting amplifier. The limiting amplifier is responsive to the load current and rendered effective by the timer and the selector during the make transient. The final control element is connected, on the other hand, to the trigger, which is operated responsive to the load current and controlled by the selector. During the make transient, the load current is limited to an adjustable value for a time determined by the timer. When a predetermined response threshold current value is exceeded, the voltage applied to the transistor initiates the switching operation to trigger the circuit into the cut-off state.

In another embodiment of the invention, the selected response threshold exceeds the current which can flow during the current limiting period.

The circuit according to the invention constitutes a self-contained four-terminal network. A control lead connected to the unit to be protected is not required. The invention combines a short cut-off time with optimum protection during the make transient and eliminates external starters.

The aforementioned and other features and objects of this invention and the manner of obtaining them will become more apparent, and the invention itself will be best understood by reference to the following description of an embodiment of the invention taken in conjunction with the accompanying drawings, in which.

Figure 1:
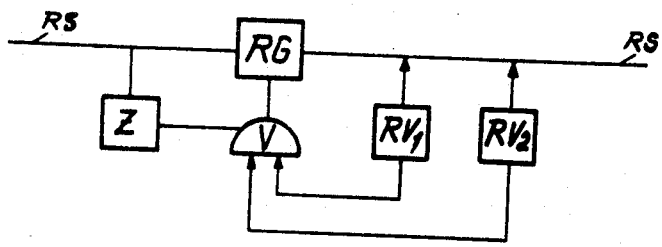
FIG. 1 shows the inventive electronic fuse in block diagram form.

As shown in FIG. 1 a controlled system RS includes a final control element RG. A first feedback loop comprises a sensing element of a first control amplifier RV1 which monitors the controlled system RS. The first feedback loop is completed by a selector V and the final control element RG. A second feedback loop comprises a sensing element of the second control amplifier RV2 which monitors the controlled system. The second feedback loop is also completed by the selector V and the final control element RG. A timer Z controls selector.

Figure 2:
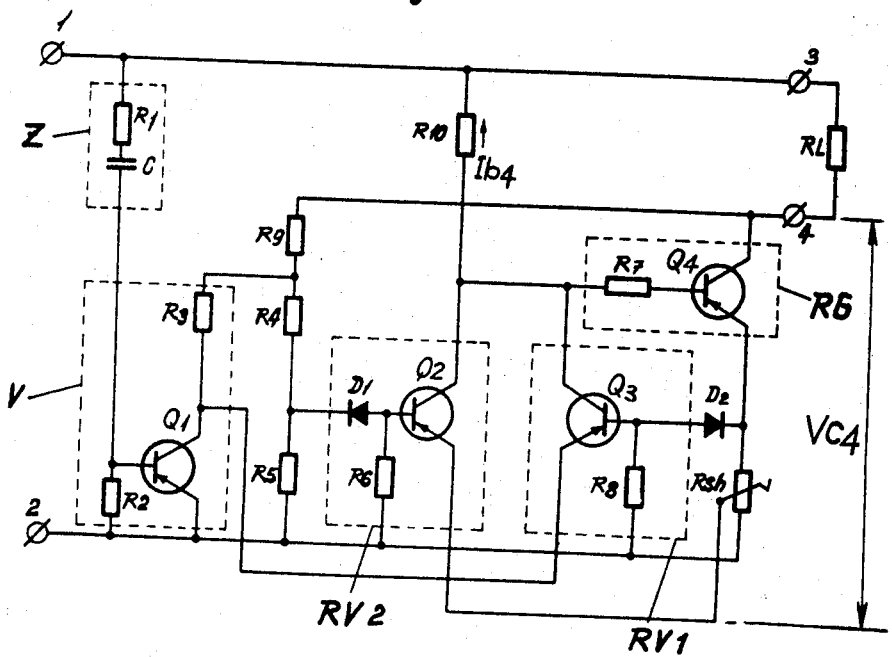
FIG. 2 shows the inventive electronic fuse schematicaly with the blocks of FIG. 1 shown as dotted line boxes.

As shown in FIG. 2 the timer Z is a resistor capacitor series network comprising resistor R1 and capacitor C. The timer Z is coupled between the input terminal 1 and a selector V.

The selector V is a transistor amplifier comprising a PNP transistor Q1. The base of transistor Q1 is coupled to a conductor connecting capacitor C to bias resistor R2. The other side of resistor R2 is connected to terminal 2. The emitter of transistor Q1 is also connected to terminal 2 while the collector of transistor Q1 is connected to load resistor R3. The collector of transistor Q1 is connected to the base of PNP transistor Q2 of the second control amplifier RV2 through resistor R3, a coupling resistor R4, and a sensing device such as threshold diode D1.

The base of transistor Q2 is biased through bias resistor R5 connected from the common point of resistor R4 and diode D1 to terminal 2. The common point between diode D1 and the base of transistor Q2 is coupled to terminal 2 through resistor R6. The emitter of transistor Q2 is coupled to the wiper of potentiometer Rsh and through the potentiometer to terminal 2. The collector of transistor Q2 is coupled to the base of PNP transistor Q4 of common control element RG through resistor R7.

The other side of potentiometer Rsh is coupled to the emitter of transistor Q4. The first control amplifier RV1 comprising PNP transistor Q3 is coupled to the common connection between potentiometer Rsh and transistor Q4 through a sensing device such as threshold diode D2 connected to the base of transistor Q3 which is biased through bias resistor R8 coupled between the base and terminal 2.

The emitter of transistor Q3 is connected to the common connection point between the collector of transistor Q1 and resistor R3. The collector of transistor Q3 is coupled to the common connecting point of the collector of transistor Q2 and resistor R7.

The collector of transistor Q4 is coupled to terminal 4. A feedback path extends from the collector of transistor Q4 to the common connection point of resistors R3 and R4 through resistor R9. The common connecting conductor extending between terminals 1 and 3 is coupled to the common connecting point of the collector of transistor Q2 and resistor R7 through resistor R10. A load resistor RL is connected across terminals 3 and 4.

Thus, FIG. 2 discloses a fully electronic protective device that provides a circuit breaker function and a current limiting function for controlling a system represented as $R_s$ in FIG. 1. $R_s$ in FIG. 2 is represented by terminals 1 and 2 on one side of control element RG and terminals 3 and 4 on the other side of control element RG. The control element RG operates as a circuit breaker or a current limiter responsive to inputs received by the element RG from a first and a second feedback loop. Included in these feedback loops are a first and a second control amplifier RV1, RV2 respectively. These amplifiers each contain a sensing means such as diodes D1 and D2 which control the conducting or nonconductive state of the amplifiers RV1, RV2. The output of the amplifiers control a selector V which determines whether the circuit breaker function or the current limiting function of the circuitry disclosed should be operated. The timing network Z is used to control the operation of the selector V while a transient start current is present.

A pulse-modulated base current $I_{B4}$ corresponding to a collector saturation current $I_{C4sat}$ (approximately at the response threshold current value) is applied by the resistor R10 to the transistor Q4. The following equation is applicable to the collector voltage:

$$V_{C4} = V_{Rsh} + V_{CE4sat'}$$

where $V_{Rsh}$ is the voltage at potentiometer R$sh$ and $V_{CE4sat}$ is the saturation voltage between collector and emitter of transistor Q4.

*Circuit breaker function of the circuit*

When the load resistor RL connected to the terminals 3 and 4 is short-circuited or diminished by a predetermined amount the collector saturation current $I_{C4sat}$ is exceeded, that is, $V_{CE4} > V_{CE4sat'}$ so that the threshold diode D1 and with it the transistor Q2 becomes conductive. This reduces the base current of transistor Q3 and causes a fast increase in the collector-emitter voltage $V_{CE4}$. This feedback function results in the high switching speed which is required. The entire current through the resistor R10 now flows through transistor Q2. Thus, the base current $I_{B4}$ of transistor Q4 drops to zero so that the transistor Q4 is cut off. During this state, there is no current limitation because the emitter potential of transistor Q3 is negative relative to its base potential.

*Current limiting function*

When a battery voltage is applied to the terminals 1 and 2, the capacitor C will charge. The charging current $I_C$ for the capacitor C is approximately as high as the base current $I_{B1}$ of transistor Q1. This reduces the collector-emitter voltage $V_{CE1}$ below the response threshold of diode D1, which is thus cut off cutting off transistor Q2. The transistor Q4 is thereby rendered conductive.

The transistor Q3 is caused to conduct because its emitter is grounded by the transistor Q1. If the voltage drop at the resistor R$sh$ due to the load current is sufficient to cause the threshold diode D2 to conduct, the feedback amplification for the current limiting function becomes effective. The transistor Q3 takes part of the base current of transistor Q4 so that the load current $I_{RL}$ is limited.

The base current $I_{B1}$ of transistor Q1 decreases in accordance with an exponential function. After a predetermined time, the transistor Q1 is cut off and its collector potential increases so that the current limiting function is terminated.

Short-circuiting the load resistor will cause the threshold voltage of diode D1 to be exceeded before the current limiting function is eliminated. This results in the immediate opening of the circuit.

While the principles of the invention have been described above in connection with specific apparatus and applications, it is to be understood that this description is made only by way of example and not as a limitation on the scope of the invention.

We claim:

1. A fully electronic overload protection circuit for regulating and controlling the voltage and current of a system and limiting the make transient current, comprising final control means, said final control means operated responsive to a first and a second feedback loop, each feedback loop including sensing means for sensing the output levels of the controlled system, selector means common to both feedback loops for operating said final control means, a first and a second control amplifier for coupling the said sensing means to the selector, and timer means connected to the controlled system before the final control element for cooperating with the control amplifier to control the selector.

2. An overload protection device according to claim 1, wherein: said final control means comprises transistor means, the first control amplifier is a limiting amplifier for limiting current through said transistor means, and the second control amplifier comprises a trigger circuit for rendering said transistor means conductive.

3. An overload protection device according to claim 2 wherein means are provided for actuating said limiting amplifier responsive to said selector under the control of said timer means during the make transient, and means for coupling said final control means to the trigger circuit which is operated responsive to the load current and controlled by the selector means, whereby during the make transient the load current is limited to an adjustable value for a time determined by the timer means, and means including said first sensing means operated when a predetermined response threshold current value is exceeded, for applying a voltage to the transistor means that initiates the switching operation to cut-off said transistor means.

4. An overload protection device according to claim 3 wherein said sensing means comprise a first and a second diode and wherein said first diode senses the response threshold current when it exceeds the current which can flow during the current limiting period.

References Cited

UNITED STATES PATENTS

| | | | |
|---|---|---|---|
| 2,740,086 | 3/1956 | Evans et al. | 317—33 X |
| 3,264,550 | 8/1966 | Paice | 323—9 |
| 3,305,763 | 2/1967 | Kupferberg et al. | 323—9 |

LEE T. HIX, *Primary Examiner.*

J. D. TRAMMELL, *Assistant Examiner.*